US012407825B2

United States Patent
Andersson et al.

(10) Patent No.: US 12,407,825 B2
(45) Date of Patent: Sep. 2, 2025

(54) DEBLOCKING USING SUB-PEL MOTION VECTOR THRESHOLD

(71) Applicant: Telefonaktiebolaget LM Ericsson (publ), Stockholm (SE)

(72) Inventors: Kenneth Andersson, Gävle (SE); Jack Enhorn, Kista (SE); Ruoyang Yu, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/535,787

(22) Filed: Dec. 11, 2023

(65) Prior Publication Data

US 2024/0187583 A1     Jun. 6, 2024

Related U.S. Application Data

(63) Continuation of application No. 17/434,074, filed as application No. PCT/SE2020/050193 on Feb. 19, 2020, now Pat. No. 11,902,516.

(Continued)

(51) Int. Cl.
*H04N 19/117* (2014.01)
*H04N 19/105* (2014.01)
(Continued)

(52) U.S. Cl.
CPC ......... *H04N 19/117* (2014.11); *H04N 19/105* (2014.11); *H04N 19/137* (2014.11); *H04N 19/159* (2014.11); *H04N 19/176* (2014.11)

(58) Field of Classification Search
CPC .. H04N 19/117; H04N 19/105; H04N 19/137; H04N 19/159; H04N 19/176
(Continued)

(56) References Cited

U.S. PATENT DOCUMENTS

2006/0133504 A1    6/2006   Jung et al.
2006/0251174 A1*  11/2006   Caviedes ............... H04N 19/44
                                                       375/E7.19

(Continued)

FOREIGN PATENT DOCUMENTS

JP    2014-535238    12/2014
JP    2019-503629     2/2019

(Continued)

OTHER PUBLICATIONS

Sjöberg, R., et al., "Description of SDR and HDR video coding technology proposal by Ericsson and Nokia", Joint Video Exploration Team (JVET) of ITU-T SG 16 WP 3 and ISO/IEC JTC 1/SC 29/WG 11, Document: JVET-J0012-v1, 10th Meeting: San Diego, CA, USA, Apr. 10-20, 2018 (32 pages).

(Continued)

*Primary Examiner* — Dominic D Saltarelli
(74) *Attorney, Agent, or Firm* — Rothwell, Figg, Ernst & Manbeck, P.C.

(57) ABSTRACT

A method for deblocking at least one boundary of a coding unit, wherein the boundary forms a first side and a second side of the coding unit, wherein a video picture comprises the coding unit, and wherein the first and second sides use a same reference picture. The method includes obtaining a first motion vector component in the first side; obtaining a second motion vector component in the second side; determining whether an absolute difference between the first motion vector component and the second motion vector component is equal to or larger than a predetermined threshold that is less than 1 sample; and as a result of determining that the absolute difference between the first motion vector component and the second motion vector component is equal to or larger than the predetermined threshold, applying (Continued)

deblocking to the vertical or horizontal boundary between the first side and the second side.

20 Claims, 9 Drawing Sheets

Related U.S. Application Data

(60) Provisional application No. 62/811,354, filed on Feb. 27, 2019.

(51) Int. Cl.
*H04N 19/137* (2014.01)
*H04N 19/159* (2014.01)
*H04N 19/176* (2014.01)

(58) Field of Classification Search
USPC .................................................. 375/240.02
See application file for complete search history.

(56) References Cited

U.S. PATENT DOCUMENTS

| | | |
|---|---|---|
| 2009/0274215 A1 | 11/2009 | Metsugi |
| 2010/0135389 A1 | 6/2010 | Tanizawa et al. |
| 2011/0194614 A1 | 8/2011 | Norkin et al. |
| 2013/0182764 A1 | 7/2013 | Narroschke et al. |
| 2013/0251029 A1 | 9/2013 | Ikeda |
| 2013/0259142 A1 | 10/2013 | Ikeda et al. |
| 2014/0072043 A1 | 3/2014 | Tourapis et al. |
| 2014/0369428 A1 | 12/2014 | Park et al. |
| 2018/0359484 A1 | 12/2018 | Chen et al. |
| 2020/0322632 A1 | 10/2020 | Hanhart |
| 2021/0021819 A1 | 1/2021 | Ikeda |
| 2021/0037245 A1 | 2/2021 | Lim |
| 2021/0051329 A1 | 2/2021 | Ko |
| 2021/0076029 A1 | 3/2021 | Han |

FOREIGN PATENT DOCUMENTS

| | | |
|---|---|---|
| WO | 2012/077607 | 6/2012 |
| WO | 2014/039229 | 3/2014 |

OTHER PUBLICATIONS

Jeong, C., et al., "A Linear Model-Based Sub-Pixel Motion Estimation Method for H.264/AVC Standard", Workshop on Picture Coding and Image Processing, PCSJ2010/IMPS2010, Dec. 7, 2010, Nagoya, Japan (2 pages).

International Search Report and Written Opinion issued in International Application No. PCT/SE2020/050193 dated Apr. 28, 2020 (16 pages).

Benjamin Bross et al., Versatile Video Coding (Draft 4), Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M1001-v4 (267 pages).

"H.265: High efficiency video coding" ITU-T, Telecommunications Standardization Sector of ITU, ISO/IEC JTC 1/SC 29/WG 11 (MPEG), Feb. 2018 (692 pages).

K. Andersson et al., "CE11-related: On MV threshold for deblocking", Joint Video Experts Team (JVET) of ITU-T SG 16 WP 3 and ISO/IEC JTC 1/SC 29/WG 11 (doc JVET-N0359_r1), 14th Meeting: Geneva, CH, Mar. 19-27, 2019 (5 pages).

Benjamin Bross et al., Versatile Video Coding (Draft 4), Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M1001-v2 (248 pages).

Bross et al., "Versatile Video Coding (Draft 4)", Joint Video Experts Team (JVET) of ITU-T SG 16 WP 3 and ISO/IEC JTC 1/SC 29/WG 11, 13th Meeting: Marrakech, MA, Jan. 9-18, 2019, Document JVET-M1001-v1 (24 pages).

Bross et al., "Versatile Video Coding (Draft 2)," Joint Video Experts Team (JVET) of ITU-T SG 16 WP 3 and ISO/IEC JTC 1/SC 29/WVG 11, 11th Meeting: Ljubljana, SI, Jul. 10-18, 2018, Document JVET-K1001-v6 (23 pages).

* cited by examiner

DEBLOCKING USING SUB-PEL MOTION VECTOR THRESHOLD

CROSS-REFERENCE TO RELATED APPLICATIONS

This application is a continuation of U.S. application Ser. No. 17/434,074, having a section 371 (c) date of 2021 Aug. 26 (now U.S. Pat. No. 11,902,516, issued on 2024 Feb. 13), which is a 35 U.S.C. § 371 National Stage of International Application No. PCT/SE2020/050193, filed 2020 Feb. 19, which claims priority to U.S. provisional application No. 62/811,354, filed on 2019 Feb. 27. The above identified applications are incorporated by this reference.

TECHNICAL FIELD

This disclosure relates to High Efficiency Video Coding (HEVC) and Versatile Video Coding (VVC).

BACKGROUND

A video sequence consists of a series of images where each image consists of one or more components. Each component can be described as a two-dimensional rectangular array of sample values. It is common that an image in a video sequence consists of three components; one luma component Y where the sample values are luma values and two chroma components Cb and Cr, where the sample values are chroma values. Other examples include Y' Cb Cr, Yuv and $IC_TC_P$. In $IC_TC_P$, I is the "intensity luma" component. For the remainder of this document we will refer to any luma component Y', Y or I as Y or simply luma. It is common that the dimensions of the chroma components are smaller than the luma components by a factor of two in each dimension. For example, the size of the luma component of an HD image would be 1920×1080 and the chroma components would each have the dimension of 960×540. Components are sometimes referred to as color components.

A block is one two-dimensional array of samples. In video coding, each component is split into blocks and the coded video bitstream is a series of blocks. It is common in video coding that the image is split into units that cover a specific area of the image. Each unit consists of all blocks from all components that make up that specific area and each block belongs fully to one unit. The macroblock in H.264 and the Coding unit (CU) in HEVC are examples of units.

In HEVC, each picture is partitioned into coding tree units (CTU). A CTU consists of an N×N block of luma samples and two M×M corresponding chroma blocks. A CTU in HEVC is like macroblocks in H.264 and earlier standards but in contrast to macroblocks the CTU size is configurable. Most often, however, the CTU size in HEVC is set to 64×64 luma samples. Each CTU can be recursively quadtree split. The root of the quadtree is then associated with the CTU. The quadtree is split until a leaf is reached, which is referred to as the coding unit (CU). A CU in HEVC always consist of a luma block with equal height and width. How each CTU is split is conveyed in the bitstream. The CU is further the root node of two other trees, the prediction tree that has got prediction units (PUs) as nodes and the transform tree that has got transform units (TUs) as nodes. Some decoding processes in HEVC is done on the CU level, some is done on the PU level and some on TU level. Boundaries between PUs and boundaries between TUs are filtered by a deblocking filter to reduce discontinuities between TUs and PUs. In HEVC there exist two kinds of prediction types for a PU, intra prediction which only uses prediction from previously decoded samples of the current picture for prediction, and inter prediction which uses prediction form at least one previously decoded picture.

In HEVC, deblocking is first applied on vertical boundaries and then on horizontal boundaries. The boundaries are either TU boundaries or PU boundaries. To enable parallel friendly deblocking, the deblocking is performed on an 8×8 sample grid.

A deblocking filter strength parameter (bs) is set for each boundary. If the value of bs is larger than 0, then deblocking may be applied. The larger the boundary strength is, the stronger filtering is applied. First it is checked, if any of the blocks at a PU boundary between the blocks is an intra predicted block then (bs is set to=2), or if both blocks use inter prediction but and they use different reference frames or have significantly different motion vectors (a difference of 1 luma sample or larger in at least one motion vector component, vertical or horizontal motion vector component) then (bs is set to =1). It is also checked if a TU boundary between the blocks has non-zero transform coefficients in at least one of the blocks (code block flag CBF equal to 1), then (bs is set to =1). This first checks sets a boundary strength (bs) which is larger than 0 to indicate that deblocking should be applied. The larger the boundary strength is the stronger filtering is applied. To reduce/avoid removing natural structures when deblocking, a check that there are not any natural structures on respective sides of the boundary is then applied for luma. In HEVC, gradient calculations are used on respective sides of the boundary using the following inequality: abs(p0−2*p1+p2)+abs(q0−2*q1+q2)<beta, where beta is a parameter based on the quantization parameter for the block and p0, p1, to p2 are samples on one side of the block boundary and q0, q1, to q2 are samples on the other side of the block boundary. The condition is checked at two positions along the boundary, and if both conditions are fulfilled, then the luma samples are deblocked for that 4 sample part of the boundary. Chroma boundaries may always be filtered if one any of the neighbouring blocks are intra coded.

In the current draft of the specification for VVC (VVC draft 2 JVET-M1001) a coding tree unit (CTU) is similar to the CTU in HEVC with the difference that the CTU in H.266 has a size of 128×128 luma samples. In VVC, the CTU can be split more flexibly such that a resulting CUs may consist of a rectangular luma block. In VVC, there is no prediction tree or transform tree as in HEVC. However, a CU in VVC can be divided into a multiple of TUs in cases as follows:
(1) a CU has a size larger than the maximum transform size. For example if the max transform size is 64×64 and the CU has a size of 128×128 the CU is divided into four 64×64 implicit split transform blocks, as shown in FIG. 1;
(2) a CU uses SBT, Sub-Block Transform, which may enable one sub-block transform of size ½ or ¼ of the CU size either vertically or horizontally with non-zero coefficients, where direction (horizontal or vertical), position (first or second sub-block for size ½, first or last sub-block for size ¼) and size (½ or ¼) is derived from the bitstream, as shown in FIG. 2;
(3) a CU uses ISP, Intra Sub-Partitions, which may enable 4 sub-blocks each of size ¼ of the CU size either vertically or horizontally or for smaller blocks 2 sub-blocks each of size ½ of the CU size either vertically or horizontally, as shown in FIG. 3.

In VVC, a CU can be divided into multiple prediction sub-blocks in cases as follows:

(1) a CU uses sub-block inter prediction tool AFFINE. This tool can have motion parameters (motion vector and indication of reference frame) on sub-block size 4×4;
(2) a CU uses sub-block inter prediction tool ATMVP. This tool can have motion parameters (motion vector and indication of reference frame) on sub-block size 8×8, as shown in FIG. 4;
(3) a CU uses a Combined Intra Inter Prediction mode that uses four sub-block specific weights each for ¼ size of the CU in the direction of the prediction for weighted combination of intra and inter prediction, as shown in FIG. 5.

In the current draft of VVC, a new tool called reshaping has been introduced. This reshaping tool can signal how to map ranges of sample values on a picture or tile basis inside a coding loop for better coding efficiency and then remap the ranges of sample values when reconstructing the sample.

In VVC, the deblocking is applied on an 8×8 grid for CUs that have a CU boundary aligned with an 8×8 grid first on vertical boundaries (CU/implicit TU/prediction sub-block boundaries) and then on horizontal boundaries (CU/implicit TU/prediction sub-blocks). The deblocking is based on HEVC deblocking and also longer deblocking filter if the size orthogonal to the block boundary is equal to or larger than 32 on at least one side for luma modifying at most 7 samples and reading at most 8 samples on that side, if the size orthogonal to the block boundary is less than 32 for one side for luma it modifies at most 3 samples and reading at most 4 samples on that side, and if it is equal to or larger than 8 on both side of a boundary in chroma samples for chroma modifying at most 3 chroma samples and reading at most 4 chroma samples on respective side of the boundary otherwise it modifies at most one sample and reading at most two samples on respective side of the boundary.

Both CU, implicit TU and prediction sub-block boundaries can be deblocked in parallel since the number of samples to read and modify is restricted depending on:
(1) the max number of samples to modify for a CU or implicit TU boundary is limited to 5 (reading at most 6 samples) if the CU uses prediction sub-blocks;
(2) the max number of samples to modify for a prediction sub-block boundary adjacent to a CU or implicit TU boundary is 2 on both side of such boundaries (reading at most 3 samples on each side);
(3) otherwise the max number of samples to modify is 3 on each side of a boundary.

Only a CTU line buffer of 4 for luma and 2 for chroma is needed due to restricting the max number of samples to modify to 3 samples for luma (reading at most 4 samples) on the side that is above the boundary and 1 chroma sample for chroma (reading at most 2 samples) on both sides of the boundary for horizontal boundaries that are aligned with the CTU boundary.

The long filter decisions for luma are applied if at least one side has a CU width which is equal to 32 or larger for vertical boundaries and CU height which is equal to 32 or larger for horizontal boundaries. The P side has a variable bSidePisLargeBlk which is set to 1 if that side is 32 or longer and otherwise it is set to 0. The Q side has a variable bSideQisLargeBlk which is set to 1 if that side is 32 or longer, otherwise it is set to 0.

In FIG. 6, a boundary 606 between a block P 602 and a block Q 604 is shown for 4 lines (line 0 to line 3) and for samples 0 to 7 for each line and block.

Long filter decisions for deblocking of a vertical boundary, as shown in FIG. 6, are described in further detail below. The long filter decisions described below may apply similarly for a horizontal boundary.

First, the long filter decision checks if the sides of the boundary are smooth enough on line 0 and line 3:

If bSidePisLargeBlk is equal to 1
$dp0L = (Abs( p_{2,0} - 2 * p_{1,0} + p_{0,0} ) + Abs( p_{5,0} - 2 * p_{4,0} + p_{3,0} ) + 1) \gg 1$
$dp3L = (Abs( p_{2,3} - 2 * p_{1,3} + p_{0,3} ) + Abs( p_{5,3} - 2 * p_{4,3} + p_{3,3} ) + 1) \gg 1$
Otherwise
$dp0L = Abs( p_{2,0} - 2 * p_{1,0} + p_{0,0} )$
$dp3L = Abs( p_{2,3} - 2 * p_{1,3} + p_{0,3} )$
If bSideQisLargeBlk is equal to 1
$dq0L = (Abs( q_{2,0} - 2 * q_{1,0} + q_{0,0} ) + Abs( q_{5,0} - 2 * q_{4,0} + q_{3,0} ) + 1) \gg 1$
$dq3L = (dq3 + Abs( q_{5,3} - 2 * q_{4,3} + q_{3,3} ) + 1) \gg 1$
Otherwise
$dq0L = Abs( q_{2,0} - 2 * q_{1,0} + q_{0,0} )$
$dq3L = Abs( q_{2,3} - 2 * q_{1,3} + q_{0,3} )$
$dpq0L = dp0L + dq0L$
$dpq3L = dp3L + dq3L$
$dL = dpq0L + dpq3L$ If dL is less than $\beta$ (QP dependent parameter), additional long filter decision checks for both line=0 and line=3 are performed as follows:

If bSidePisLargeBlk
$sp = (Abs( p_{3,line} - p_{0,line} ) + Abs( p_{maxFilterLengthP,line} - p_{3,line} ) + 1) \gg 1$
else
$sp = Abs( p_{3,line} - p_{0,line} )$
If bSideQisLargeBlk
$sq = (Abs( q_{0,line} - q_{3,line} ) + Abs( q_{maxFilterLengthQ,line} - q_{0,line} ) + 1) \gg 1$
else
$sq = Abs( q_{0,line} - q_{3,line} )$
$dSam0 = (2 * dpq0L < ( \beta \gg 2 ) \text{ \&\& } (sp + sq < 3*\beta \gg 5) \text{ \&\& } (Abs( p_{0,line} - q_{0,line} ) < (5 * tC + 1 ) \gg 1)$
$dSam3 = (2 * dpq3L < ( \beta \gg 2 ) \text{ \&\& } (sp + sq < 3*\beta \gg 5) \text{ \&\& } (Abs( p_{0,line} - q_{0,line} ) < ( 5 * tC + 1 ) \gg 1)$ where tC is a QP dependent parameter.

If the additional long filter decision checks dSam0 and dSam3 are also true, the long deblocking filter is applied as follows for lines 0 to 3, here with no indication of which line as shown below:

$p_i' = Clip3( p_i - (tC*tCPD_i) \gg 1, p_i + (tC*tCPD_i) \gg 1, ( refMiddle*f_i + refP*(64-f_i) + 32) \gg 6 )$
$q_j' = Clip3( q_j - (tC*tCQD_j) \gg 1, q_j + (tC*tCQD_j) \gg 1, ( refMiddle*g_j + refQ*(64-g_j) + 32) \gg 6 )$ where i=0 . . . maxFilterLengthP−1 and j=0 . . . maxFilterLengthQ−1, and where refMiddle, refP and refQ are three pre-filtered samples where refMiddle is centered in the middle between block P and Q, refP is in block P and refQ is in block Q, g and f are vectors with interpolation filter coefficients for Q side and P side, tCPD and tCQD are vectors with position dependent clipping values for P side and Q side, which are derived as shown below based on maxFilterLengthP and maxFilterLengthQ:

If maxFilterLengthP is equal to maxFilterLengthQ
  If maxFilterLengthP is equal to 5
    refMiddle = $(p_4 + p_3 + 2^* (p_2 + p_1 + p_0 + q_0 + q_1 + q_2) + q_3 + q_4 + 8) >> 4$
  Otherwise
    refMiddle = $(p_6 + p_5 + p_4 + p_3 + p_2 + p_1 + 2^* (p_0 + q_0) + q_1 + q_2 + q_3 + q_4 + q_5 + q_6 + 8) >> 4$
Otherwise If ((maxFilterLengthQ is equal to 7 and maxFilterLengthP is equal to 5) or
       (maxFilterLengthQ is equal to 5 and maxFilterLengthP is equal to 7)
    refMiddle = $(p_4 + p_3 + 2^* (p_2 + p_1 + p_0 + q_0 + q_1 + q_2) + q_3 + q_4 + 8) >> 4$
Otherwise If ((maxFilterLengthQ is equal to 5 and maxFilterLengthP is equal to 3) or
       (maxFilterLengthQ is equal to 3 and maxFilterLengthP is equal to 5)
    refMiddle = $(p_3 + p_2 + p_1 + p_0 + q_0 + q_1 + q_2 + q_3 + 4) >> 3$
Otherwise If ((maxFilterLengthQ is equal to 7 and maxFilterLengthP is equal to 3)
    refMiddle = $(2^*(p_2 + p_1 + p_0 + q_0) + p_0 + p_1 + q_1 + q_2 + q_3 + q_4 + q_5 + q_6 + 8) >> 4$
Otherwise
    refMiddle = $(p_6 + p_5 + p_4 + p_3 + p_2 + p_1 + 2^*(q_2 + q_1 + q_0 + p_0) + q_0 + q_1 + 8) >> 4$
refP = $(p_{maxFilterLengthP} + p_{maxFilterLengthP-1} + 1) >> 1$
refQ = $(q_{maxFilterLengtQ} + q_{maxFilterLengthQ-1} + 1) >> 1$ The variables $f_i$ and $tCPD_i$ are defined as follows:

If maxFilterLengthP is equal to 7
  $f_{0..6} = \{59, 50, 41, 32, 23, 14, 5\}$
  $tCPD_{0..6} = \{6, 5, 4, 3, 2, 1, 1\}$
Otherwise if maxFilterLengthP is equal to 5
  $f_{0..4} = \{58, 45, 32, 19, 6\}$
  $tCPD_{0..4} = \{6, 5, 4, 3, 2\}$
Otherwise
  $f_{0..2} = \{53, 32, 11\}$
  $tCPD_{0..2} = \{6, 4, 2\}$ The variables $g_j$ and $tCQD_j$ are defined as follows:

If maxFilterLengthQ is equal to 7
  $g_{0..6} = \{59, 50, 41, 32, 23, 14, 5\}$
  $tCQD_{0..6} = \{6, 5, 4, 3, 2, 1, 1\}$
Otherwise if maxFilterLengthQ is equal to 5
  $g_{0..4} = \{58, 45, 32, 19, 6\}$
  $tCQD_{0..4} = \{6, 5, 4, 3, 2\}$
Otherwise
  $g_{0..2} = \{53, 32, 11\}$
  $tCQD_{0..2} = \{6, 4, 2\}$ In VVC, the boundary strength (bS) is set individually for luma and chroma components, both luma and chroma is given a bS equal to 2 for a transform block boundary if intra mode is used on either side, or if Combined Intra Inter Prediction (CIIP) is used on either side. If the boundary is a transform block boundary and the transform block have non-zero transform coefficients on a color component, that component is given a Bs equal to 1. For other instances, the boundary strength is set to 0 for both chroma components which correspond to no deblocking. If the boundary is a prediction block/sub-block boundary and CIIP is used on either side, the bS is set equal to 1 for luma. If the boundary is a prediction block/sub-block boundary and there is a difference in number of reference picture used on respective side of the boundary or different reference pictures are used or if there is a significant difference in motion vectors (a difference of 1 luma sample or larger in at least one motion vector component, vertical or horizontal motion vector component) when same reference picture(s) are used, the bS is set equal to 1 for luma. Otherwise, the bS is set equal to 0 for luma which corresponds to no deblocking of luma.

SUMMARY

One problem with VVC is that the deblocking decision is based on a difference in motion which is too large when using a motion accuracy that is significantly lower than full-pel (motion accuracy is 1/16 for luma in the current VVC test model (VTM)).

In one embodiment, a motion vector threshold is used with sub-pel accuracy for comparing motion vectors of respective sides of a block boundary.

In one embodiment, a threshold for comparing motion vector components in neighboring blocks is used to decide whether to apply deblocking. In some embodiments, the threshold is smaller than a full pixel difference.

In an aspect, there is provided a method for deblocking at least one vertical or horizontal boundary of a coding unit, wherein the vertical or horizontal boundary forms a first side and a second side of the coding unit, wherein a video picture comprises the coding unit, and wherein the first and second sides use a same reference picture. In some embodiments, the method includes obtaining a first motion vector component in the first side and obtaining a second motion vector component in the second side. The method also includes determining whether an absolute difference between the first motion vector component and the second motion vector component is equal to or larger than a predetermined threshold that is less 1 sample. The method further includes applying deblocking to the vertical or horizontal boundary between the first side and the second side as a result of determining that the absolute difference between the first motion vector component and the second motion vector component is equal to or larger than the predetermined threshold.

In some embodiments, the first motion vector component comprises a first horizontal motion vector component or a first vertical motion vector component in the first side, and the second motion vector component comprises a second horizontal motion vector component or a second vertical motion vector component in the second side.

In some embodiments, the predetermined threshold is N/16, where N is a whole number less than 16.

In some embodiments, the predetermined threshold equals N where N is less than M and 1/M is the motion vector accuracy in parts of pixels.

In some embodiments, the method further includes including the predetermined threshold in a bitstream. In some embodiments, the predetermined threshold is included in a slice header. In other embodiments, the method further includes deriving (e.g., decoding) the predetermined threshold from a bitstream. In some embodiments, the predetermined threshold is derived from a slice header of the bitstream.

In some embodiments, a first value is applied for the predetermined threshold when the video picture is a first temporal layer, a second value is applied for the predetermined threshold when the video picture is a second temporal layer, and the first temporal layer is higher than the second temporal layer and the first value is lower than the second value.

In some embodiments, a first value is applied for the predetermined threshold when the video picture uses a first quantization parameter (QP), a second value is applied for the predetermined threshold when the video picture uses a second QP, and the first QP is higher than the second QP and the first value is lower than the second value.

In some embodiments, a first value is applied for the predetermined threshold when the first side comprises a first coding unit (CU), the second block comprises a second CU, and the vertical or horizontal boundary comprises a CU boundary, a second value is applied for the predetermined threshold when the first side comprises a first sub-block, the second block comprises a second sub-block, and the vertical or horizontal boundary comprises a sub-block boundary, and the first value is lower than the second value.

In some embodiments, a first value is applied for the predetermined threshold when unidirection prediction is used for the video picture, a second value is applied for the predetermined threshold when bi-direction prediction is used for the video picture, and the first value is lower than the second value.

In some embodiments, a first value is applied for the predetermined threshold when the first and second sides use unidirection prediction, a second value is applied for the predetermined threshold when the first and second sides use bi-direction prediction, and the first value is lower than the second value.

In some embodiments, the predetermined threshold is reduced when a specific coding tool is used for coding the video picture. In some embodiments, reshaping is the specific coding tool.

In some embodiments, the processing circuitry is further configured to derive the predetermined threshold from a bitstream. In some embodiments, the predetermined threshold is included in a slice header.

In another aspect, there is provided an apparatus (e.g., encoder or decoder) for deblocking at least one vertical or horizontal boundary of a coding unit, wherein the vertical or horizontal boundary forms a first side and a second side of the coding unit, wherein a video picture comprises the coding unit, and wherein the first and second sides use a same reference picture. In some embodiments, the apparatus comprises processing circuitry configured to obtain a first motion vector component in the first side, obtain a second motion vector component in the second side, determine whether an absolute difference between the first motion vector component and the second motion vector component is equal to or larger than a predetermined threshold, and apply deblocking to the vertical or horizontal boundary between the first side and the second side as a result of determining that the absolute difference between the first motion vector component and the second motion vector component is equal to or larger than the predetermined threshold.

In another aspect there is provided a computer program comprising instructions for causing processing circuitry to perform any of the methods disclosed herein. In another aspect there is provided a carrier containing the computer program, where the carrier is one of an electronic signal, an optical signal, a radio signal, and a computer readable storage medium.

The embodiments disclosed herein provide a significant advantage of efficiently reducing blocking artifacts.

BRIEF DESCRIPTION OF THE DRAWINGS

The accompanying drawings, which are incorporated herein and form part of the specification, illustrate various embodiments.

DETAILED DESCRIPTION

Figure 1:
FIG. 1 illustrates a coding unit according to an embodiment.
Figure 2:
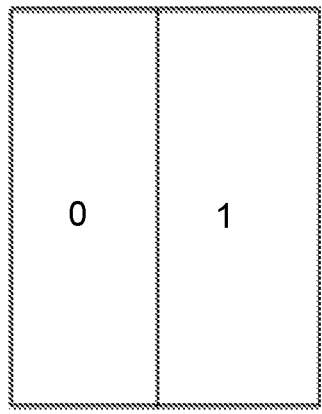
FIG. 2 illustrates coding units using Sub-Block Transform (SBT) according to some embodiments.
Figure 2:
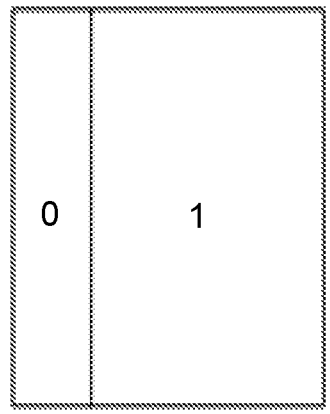
Figure 2:
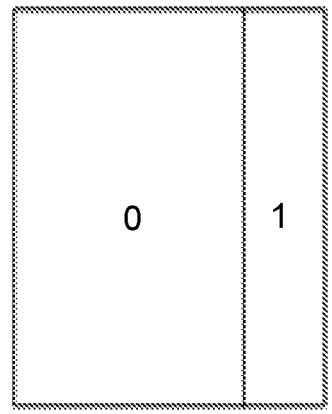
Figure 2:
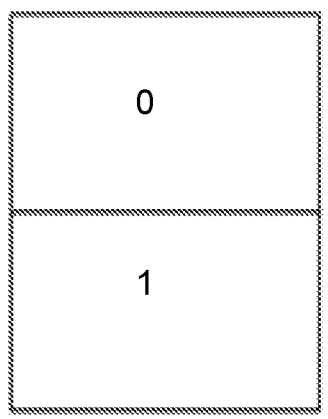
Figure 2:
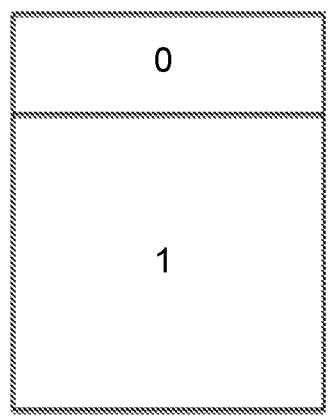
Figure 2:
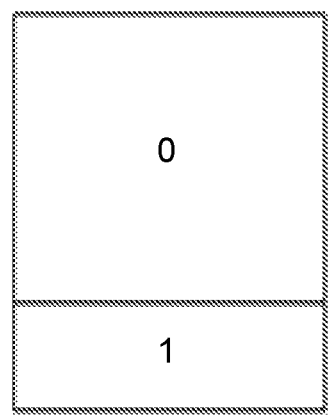
Figure 3:
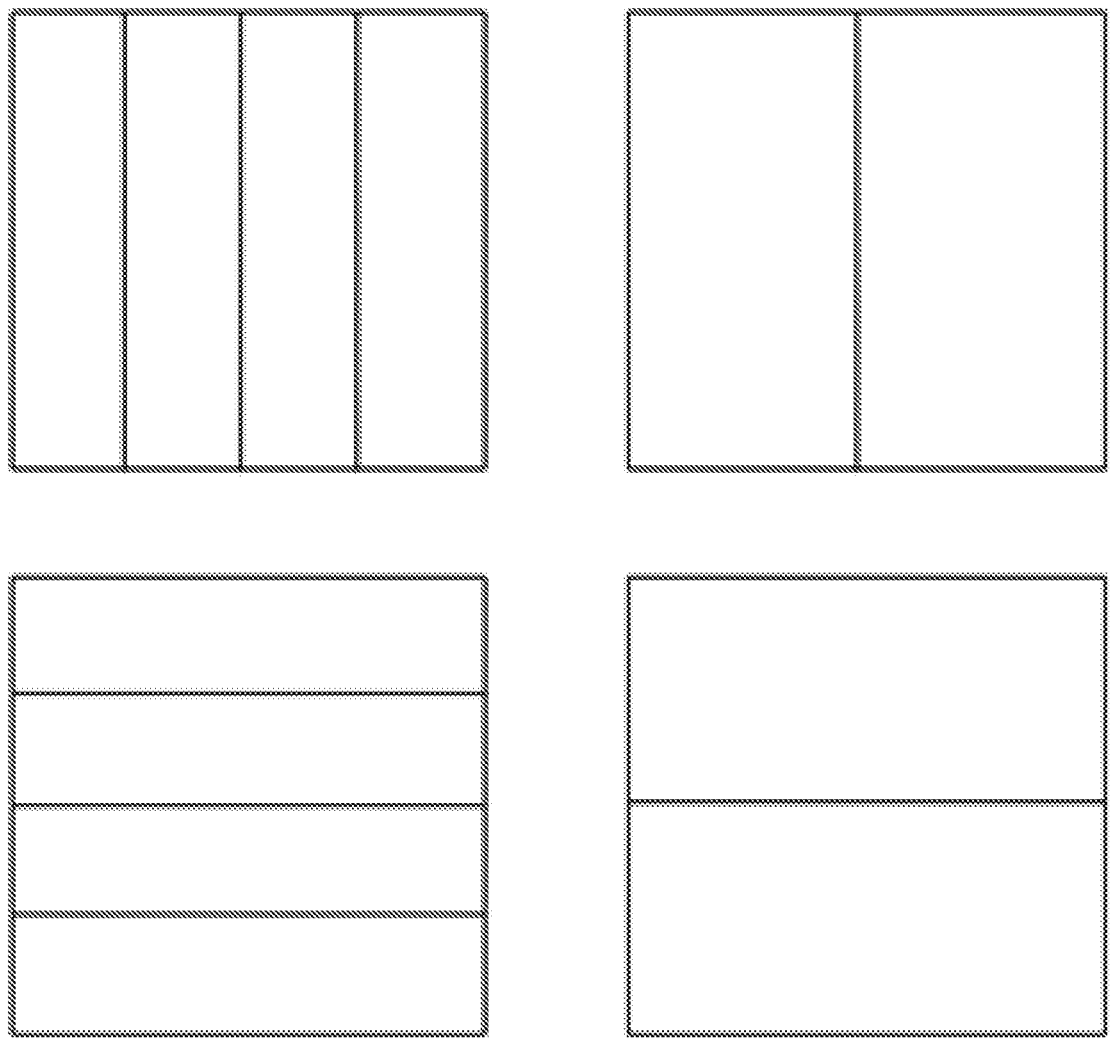
FIG. 3 illustrates coding units using Intra Sub-Partitions (ISP) according to some embodiments.
Figure 4:
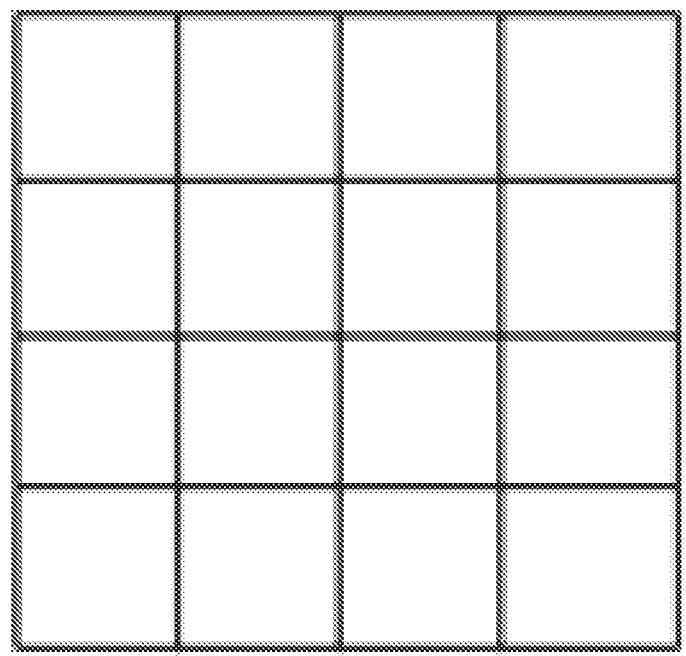
FIG. 4 illustrates a coding unit according to one embodiment.
Figure 5:
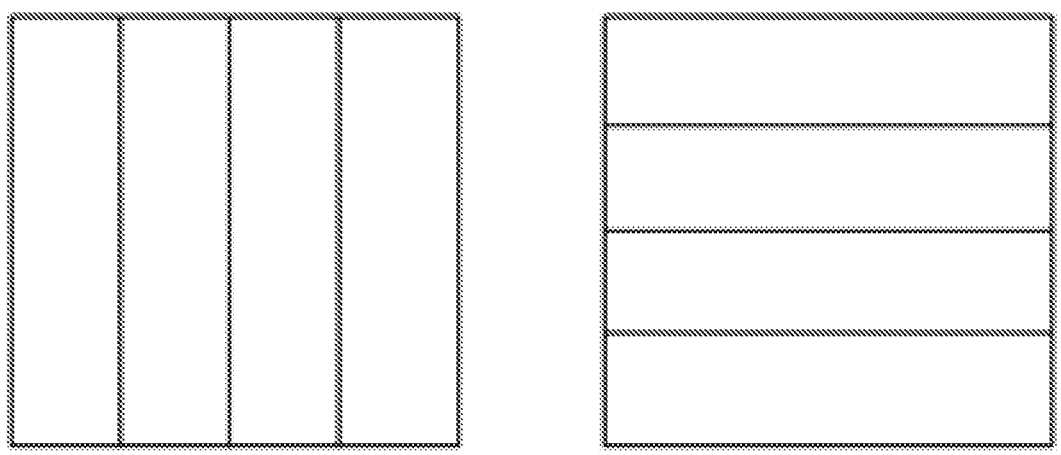
FIG. 5 illustrates coding units according to some embodiments.
Figure 6:
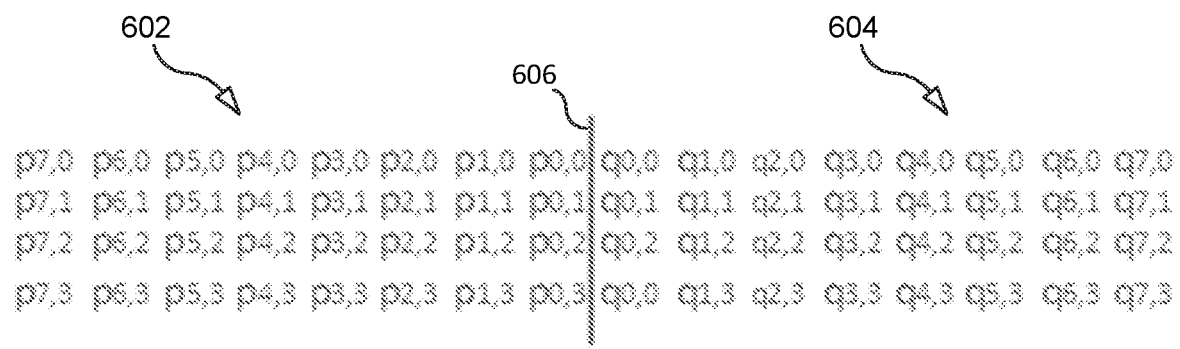
FIG. 6 illustrates a vertical boundary according to one embodiment.

The embodiments disclosed herein may be used in video or image encoder or decoder to deblock vertical and/or horizontal block/sub-block boundaries.

Embodiment 1

In this embodiment, the decision whether to apply deblocking for a boundary between a first and a second block, where both blocks use the same reference picture, is based on the absolute difference between the horizontal motion vector component in the first block and the horizontal motion vector component in the second block or the absolute difference between the vertical motion vector component in the first block and the vertical motion vector component in the second block. In some embodiments, deblocking is applied when the absolute difference between the horizontal motion vector component in the first block and the horizontal motion vector component in the second block or the absolute difference between the vertical motion vector component in the first block and the vertical motion vector component in the second block is equal to or larger than a threshold which is less than 1. In the context of the current disclosure, the value of 1 indicates one full pixel difference (1 sample).

Embodiment 2

As described above in embodiment 1, where the threshold is equal to 0.25. In the context of the current disclosure, the value of 0.25 indicates one quarter-pixel difference. Another example is to use a threshold that is equal to N/M where N is less than M and 1/M corresponds to the motion vector accuracy. One example of M is 16. Typically the motion vectors are used in fixed point to enable use of integer numbers and a pixel difference of 1 is indicated by 16 when the motion vector accuracy is 1/16.

Embodiment 3

As described above in any of the previous embodiments, e.g., embodiments 1 and 2, where the boundary strength is set equal to 1 for a boundary of luma when the decision is to apply deblocking for the boundary. A boundary with boundary strength larger than 0 means that deblocking is applied for that boundary. A higher boundary strength means a stronger deblocking is applied. For example, a boundary where one side is an intra coded block has a boundary strength of 2.

Embodiment 4

As described above in any of the previous embodiments, e.g., embodiments 1 to 3, where the threshold is decoded (or otherwise derived) from a video bitstream.

In some embodiments, the threshold is signaled at a picture level, i.e. in a slice header. In some embodiments, an encoder may signal different motion vector difference thresholds for different pictures.

For example, a lower threshold may be applied for pictures with typically higher QPs compared to pictures with typically lower QP.

Another example is for random access configuration, where a lower threshold may be applied for pictures at a higher temporal layer, i.e., pictures predicted from lower temporal layers, compared to pictures at a lower temporal layer. The reason is that lower temporal layers typically use more transform coefficients and thus have better quality while higher temporal layers typically use less transform coefficients and thus typically have worse quality.

Yet another example is for low-delay, where a lower threshold may be applied for pictures with regularly higher QP (quantization parameter) compared to pictures that use lower QP.

Embodiment 5

As described above in any of the previous embodiments, e.g., embodiments 1 to 4, where the threshold is different depending on whether the boundary is a CU/block boundary or a sub-block boundary. In such instances, a lower threshold may be applied for a CU boundary while a higher threshold may be applied for a sub-block boundary. This is because the blocking artifacts may be less severe for sub-block boundaries since an encoder may send transform coefficients to compensate.

Embodiment 6

As described above in any of the previous embodiments, e.g. embodiments 1 to 5, where the threshold is reduced if reshaping is used for the picture.

Embodiment 7

As described above in any of previous embodiments, e.g. embodiments 1 to 6, where the threshold for when only unidirectional prediction is used, e.g. prediction form only one frame, is smaller compared to the threshold when predictions are made based on more than one frame, e.g. bi-directional prediction.

In some embodiments, the threshold for when both blocks use unidirectional prediction is smaller compared to the threshold when both blocks use bi-directional prediction.

Embodiment 8

Any combination of the embodiments provided above, e.g., embodiments 1-7.

Figure 7:
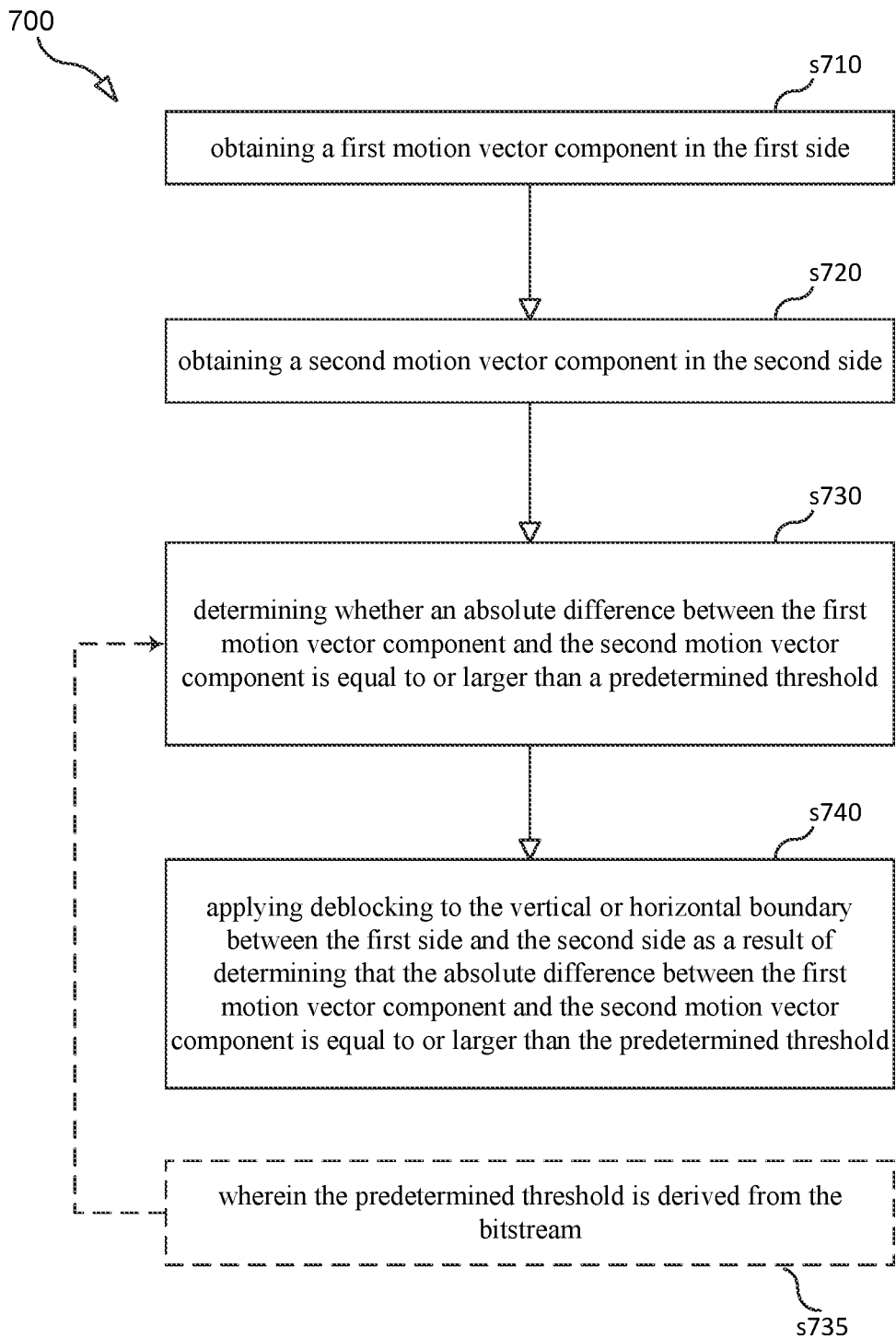
FIG. 7 is a flow chart illustrating a process according to an embodiment.

FIG. 7 is flow chart illustrating a process 700 according to an embodiment. Process 700 is a method for deblocking at least one vertical or horizontal boundary of a coding unit, wherein the vertical or horizontal boundary forms a first side and a second side of the coding unit, wherein a video picture comprises the coding unit, and wherein the first and second sides use a same reference picture. The 700 method includes obtaining a first motion vector component in the first side (s710); obtaining a second motion vector component in the second side (s720); determining whether an absolute difference between the first motion vector component and the second motion vector component is equal to or larger than a predetermined threshold (s730); and applying deblocking to the vertical or horizontal boundary between the first side and the second side (s740) as a result of determining that the absolute difference between the first motion vector component and the second motion vector component is equal to or larger than the predetermined threshold. In some embodiments, the predetermined threshold is derived from a bitstream (s735).

In some embodiments, the first motion vector component comprises a first horizontal motion vector component or a first vertical motion vector component in the first side. In some embodiments, the second motion vector component comprises a second horizontal motion vector component or a second vertical motion vector component in the second side.

In some embodiments, the predetermined threshold equals one full pixel difference.

In some embodiments, the predetermined threshold equals N where N is less than M and 1/M is the motion vector accuracy in parts of pixels.

In some embodiments, the predetermined threshold is included in the bitstream. In some embodiments, the predetermined threshold is included in a slice header.

In some embodiments, a first value is applied for the predetermined threshold when the video picture is a first temporal layer, a second value is applied for the predetermined threshold when the video picture is a second temporal layer, and the first temporal layer is higher than the second temporal layer and the first value is lower than the second value.

In some embodiments, a first value is applied for the predetermined threshold when the video picture uses a first quantization parameter (QP), a second value is applied for the predetermined threshold when the video picture uses a second QP, and the first QP is higher than the second QP and the first value is lower than the second value.

In some embodiments, a first value is applied for the predetermined threshold when the first side comprises a first coding unit (CU), the second block comprises a second CU, and the vertical or horizontal boundary comprises a CU boundary, a second value is applied for the predetermined threshold when the first side comprises a first sub-block, the second block comprises a second sub-block, and the vertical or horizontal boundary comprises a sub-block boundary, and the first value is lower than the second value.

In some embodiments, a first value is applied for the predetermined threshold when unidirection prediction is used for the video picture, a second value is applied for the predetermined threshold when bi-direction prediction is used for the video picture, and the first value is lower than the second value.

In some embodiments, a first value is applied for the predetermined threshold when the first and second sides use unidirection prediction, a second value is applied for the predetermined threshold when the first and second sides use bi-direction prediction, and the first value is lower than the second value.

In some embodiments, the predetermined threshold is reduced when a specific coding tool is used for coding the video picture. In some embodiments, reshaping is the specific coding tool.

Figure 8:
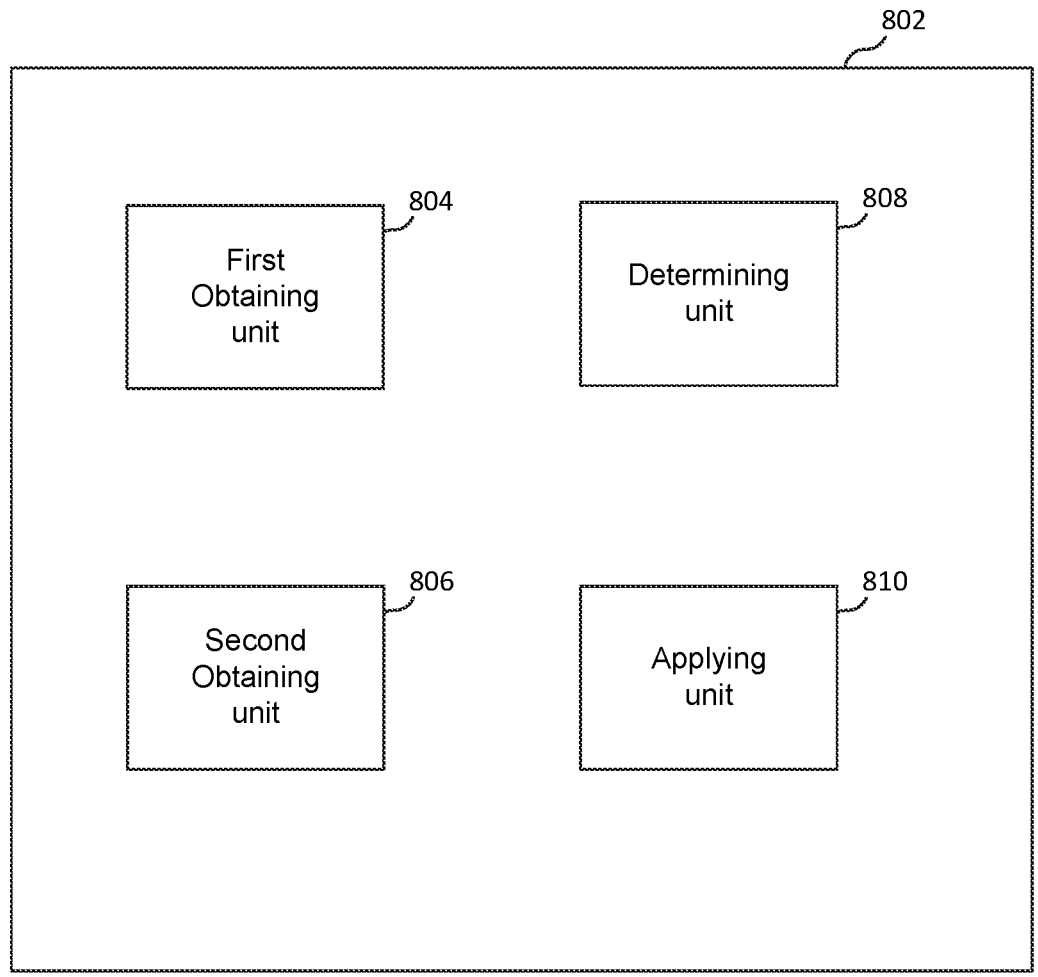
FIG. 8 is a diagram showing functional units of an encoder or decoder according to one embodiment.

FIG. 8 is a diagram showing functional units of an encoder or a decoder 802 according to some embodiments. As shown in FIG. 8, the encoder or decoder 802 includes a first obtaining unit 804 for obtaining a first motion vector component in the first side; a second obtaining unit 806 for obtaining a second motion vector component in the second side; a determining unit 808 for determining whether an absolute difference between the first motion vector component and the second motion vector component is equal to or larger than a predetermined threshold; and an applying unit 810 for applying deblocking to the vertical or horizontal boundary between the first side and the second side as a result of determining that the absolute difference between the first motion vector component and the second motion vector component is equal to or larger than the predetermined threshold. In some embodiments, the predetermined threshold is derived from a bitstream.

In some embodiments, the first motion vector component comprises a first horizontal motion vector component or a first vertical motion vector component in the first side. In some embodiments, the second motion vector component comprises a second horizontal motion vector component or a second vertical motion vector component in the second side.

In some embodiments, the predetermined threshold equals one full pixel difference. In some embodiments, the predetermined threshold equals N where N is less than M and 1/M is the motion vector accuracy in parts of pixels.

Figure 9:
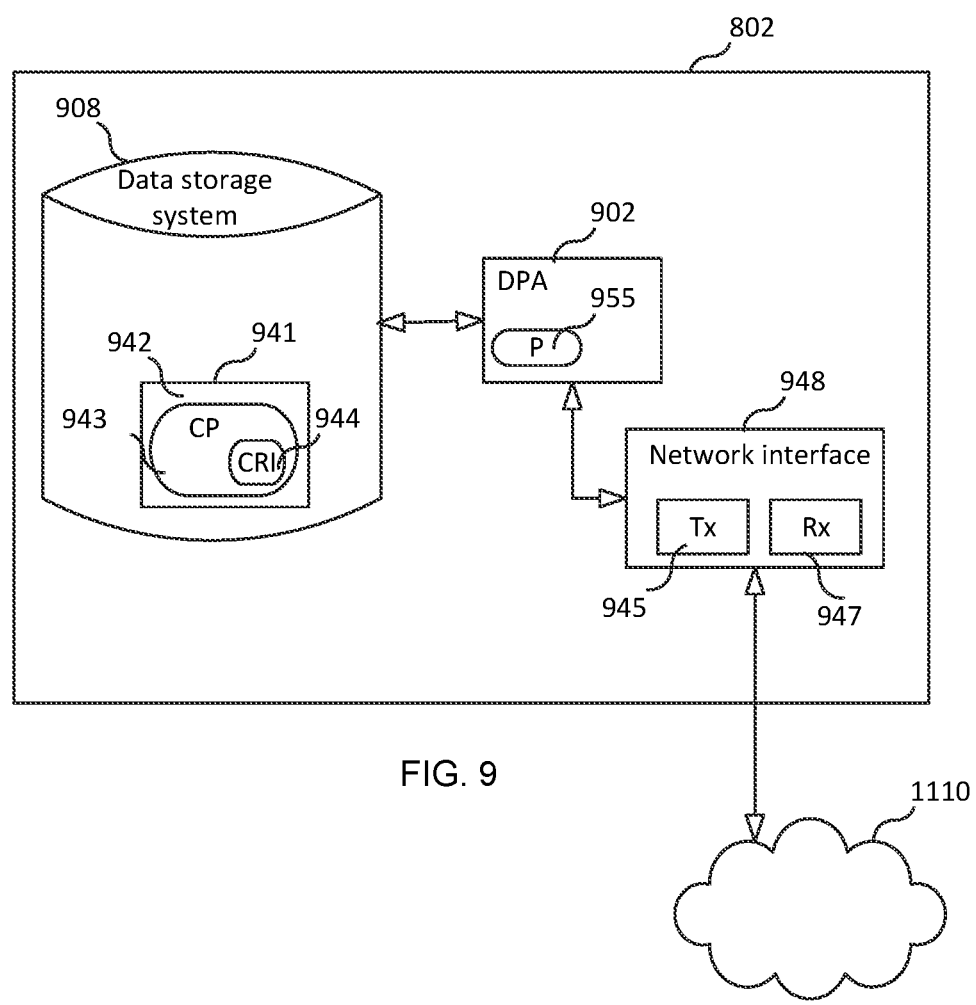
FIG. 9 is a block diagram of an apparatus according to some embodiments.

FIG. 9 is a block diagram of an apparatus (e.g., encoder or decoder 802), according to some embodiments. As shown in FIG. 9, the apparatus may comprise: processing circuitry (PC) 902, which may include one or more processors (P) 955 (e.g., a general purpose microprocessor and/or one or more other processors, such as an application specific integrated circuit (ASIC), field-programmable gate arrays (FPGAs), and the like); a network interface 948 comprising a transmitter (Tx) 945 and a receiver (Rx) 947 for enabling the apparatus to transmit data to and receive data from other nodes connected to a network 1110 (e.g., an Internet Protocol (IP) network) to which network interface 948 is connected; and a local storage unit (a.k.a., "data storage system") 908, which may include one or more non-volatile storage devices and/or one or more volatile storage devices. In embodiments where PC 902 includes a programmable processor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, magnetic media (e.g., a hard disk), optical media, memory devices (e.g., random access memory, flash memory), and the like. In some embodiments, the CRI 944 of computer program 943 is configured such that when executed by PC 902, the CRI causes the apparatus to perform steps described herein (e.g., steps described herein with reference to the flow charts). In other embodiments, the apparatus may be configured to perform steps described herein without the need for code. That is, for example, PC 902 may consist merely of one or more ASICs. Hence, the features of the embodiments described herein may be implemented in hardware and/or software.

Summary of Various Embodiments

A1. A method for deblocking at least one vertical or horizontal boundary of a coding unit, wherein the vertical or horizontal boundary forms a first side and a second side of the coding unit, wherein a video picture comprises the coding unit, and wherein the first and second sides use a same reference picture, the method comprising: obtaining a first motion vector component in the first side; obtaining a second motion vector component in the second side; determining whether an absolute difference between the first motion vector component and the second motion vector component is equal to or larger than a predetermined threshold; and as a result of determining that the absolute difference between the first motion vector component and the second motion vector component is equal to or larger than the predetermined threshold, applying deblocking to the vertical or horizontal boundary between the first side and the second side.

A2. The method of embodiment A1, wherein the first motion vector component comprises a first horizontal motion vector component or a first vertical motion vector component in the first side, and wherein the second motion vector component comprises a second horizontal motion vector component or a second vertical motion vector component in the second side.

A3. The method of embodiment A1 or A2, wherein the predetermined threshold equals one full pixel difference.

A4. The method of embodiment A1 or A2, wherein the predetermined threshold equals N where N is less than M and 1/M is the motion vector accuracy in parts of pixels.

A5. The method of any one of embodiments A1 to A4, wherein the predetermined threshold is included in a bitstream.

A6. The method of embodiment A5, wherein the predetermined threshold is included in a slice header.

A7. The method of any one of embodiments A1 to A6, wherein a first value is applied for the predetermined threshold when the video picture is a first temporal layer, wherein a second value is applied for the predetermined threshold when the video picture is a second temporal layer, and wherein the first temporal layer is higher than the second temporal layer and the first value is lower than the second value.

A8. The method of any one of embodiments A1 to A6, wherein a first value is applied for the predetermined threshold when the video picture uses a first quantization parameter (QP), wherein a second value is applied for the predetermined threshold when the video picture uses a second QP, and wherein the first QP is higher than the second QP and the first value is lower than the second value.

A9. The method of any one of embodiments A1 to A6, wherein a first value is applied for the predetermined threshold when the first side comprises a first coding unit (CU), the second block comprises a second CU, and the vertical or horizontal boundary comprises a CU boundary, wherein a second value is applied for the predetermined threshold when the first side comprises a first sub-block, the second block comprises a second sub-block, and the vertical or horizontal boundary comprises a sub-block boundary, and wherein the first value is lower than the second value.

A10. The method of any one of embodiments A1 to A6, wherein a first value is applied for the predetermined threshold when unidirection prediction is used for the video picture, wherein a second value is applied for the predetermined threshold when bi-direction prediction is used for the video picture, and wherein the first value is lower than the second value.

A11. The method of any one of embodiments A1 to A6, wherein a first value is applied for the predetermined threshold when the first and second sides use unidirection prediction, wherein a second value is applied for the predetermined threshold when the first and second sides use bi-direction prediction, and wherein the first value is lower than the second value.

A12. The method of any one of embodiments A1 to A11, wherein the predetermined threshold is reduced when a specific coding tool is used for coding the video picture.

A13. The method of A11, wherein reshaping is the specific coding tool.

A14. A computer program comprising instructions which, when executed by processing circuitry, causes the processing circuitry to carry out the method of any one of embodiments A1-A13.

A15. A carrier containing the computer program of embodiment A14, wherein the carrier is one of an electronic signal, an optical signal, a radio signal, and a computer readable storage medium.

B1. An encoder for deblocking at least one vertical or horizontal boundary of a coding unit, wherein the vertical or horizontal boundary forms a first side and a second side of the coding unit, wherein a video picture comprises the coding unit, and wherein the first and second sides use a same reference picture, the encoder comprising: processing circuitry configured to: obtain a first motion vector component in the first side, obtain a second motion vector component in the second side, determine whether an absolute difference between the first motion vector component and the second motion vector component is equal to or larger than a predetermined threshold, and as a result of determining that the absolute difference between the first motion vector component and the second motion vector component is equal to or larger than the predetermined threshold, apply deblocking to the vertical or horizontal boundary between the first side and the second side.

B2. The encoder of embodiment B1, wherein the first motion vector component comprises a first horizontal motion vector component or a first vertical motion vector component in the first side, and wherein the second motion vector component comprises a second horizontal motion vector component or a second vertical motion vector component in the second side.

B3. The encoder of embodiment B1 or B2, wherein the predetermined threshold equals one full pixel difference.

B4. The encoder of embodiment B1 or B2, wherein the predetermined threshold equals N where N is less than M and 1/M is the motion vector accuracy in parts of pixels.

B5. The encoder of any one of embodiments B1 to B4, wherein the processing circuitry is further configured to include the predetermined threshold in a bitstream.

B6. The encoder of embodiment B5, wherein the predetermined threshold is included in a slice header.

B7. The encoder of any one of embodiments B1 to B6, wherein a first value is applied for the predetermined threshold when the video picture is a first temporal layer, wherein a second value is applied for the predetermined threshold when the video picture is a second temporal layer, and wherein the first temporal layer is higher than the second temporal layer and the first value is lower than the second value.

B8. The encoder of any one of embodiments B1 to B6, wherein a first value is applied for the predetermined threshold when the video picture uses a first quantization parameter (QP), wherein a second value is applied for the predetermined threshold when the video picture uses a second QP, and wherein the first QP is higher than the second QP and the first value is lower than the second value.

B9. The encoder of any one of embodiments B1 to B6, wherein a first value is applied for the predetermined threshold when the first side comprises a first coding unit (CU), the second block comprises a second CU, and the vertical or horizontal boundary comprises a CU boundary, wherein a second value is applied for the predetermined threshold when the first side comprises a first sub-block, the second block comprises a second sub-block, and the vertical or horizontal boundary comprises a sub-block boundary, and wherein the first value is lower than the second value.

B10. The encoder of any one of embodiments B1 to B6, wherein a first value is applied for the predetermined threshold when unidirection prediction is used for the video picture, wherein a second value is applied for the predetermined threshold when bi-direction prediction is used for the video picture, and wherein the first value is lower than the second value.

B11. The encoder of any one of embodiments B1 to B6, wherein a first value is applied for the predetermined threshold when the first and second sides use unidirection prediction, wherein a second value is applied for the predetermined threshold when the first and second sides use bi-direction prediction, and wherein the first value is lower than the second value.

B12. The encoder of any one of embodiments B1 to B11, wherein the predetermined threshold is reduced when a specific coding tool is used for coding the video picture.

B13. The encoder of B11, wherein reshaping is the specific coding tool.

C1. A decoder for deblocking at least one vertical or horizontal boundary of a coding unit, wherein the vertical or horizontal boundary forms a first side and a second side of the coding unit, wherein a video picture comprises the coding unit, and wherein the first and second sides use a same reference picture, the decoder comprising: processing circuitry configured to: obtain a first motion vector component in the first side, obtain a second motion vector component in the second side, determine whether an absolute difference between the first motion vector component and the second motion vector component is equal to or larger than a predetermined threshold, and as a result of determining that the absolute difference between the first motion vector component and the second motion vector component is equal to or larger than the predetermined threshold, apply deblocking to the vertical or horizontal boundary between the first side and the second side.

C2. The decoder of embodiment D1, wherein the first motion vector component comprises a first horizontal motion vector component or a first vertical motion vector component in the first side, and wherein the second motion vector component comprises a second horizontal motion vector component or a second vertical motion vector component in the second side.

C3. The decoder of embodiment C1 or C2, wherein the predetermined threshold equals one full pixel difference.

C4. The decoder of embodiment C1 or C2, wherein the predetermined threshold equals N where N is less than M and 1/M is the motion vector accuracy in parts of pixels.

C5. The decoder of any one of embodiments C1 to C4, wherein the processing circuitry is further configured to derive the predetermined threshold from a bitstream.

C6. The decoder of embodiment C5, wherein the predetermined threshold is included in a slice header.

C7. The decoder of any one of embodiments C1 to C6, wherein a first value is applied for the predetermined threshold when the video picture is a first temporal layer, wherein a second value is applied for the predetermined threshold when the video picture is a second temporal layer, and wherein the first temporal layer is higher than the second temporal layer and the first value is lower than the second value.

C8. The decoder of any one of embodiments C1 to C6, wherein a first value is applied for the predetermined threshold when the video picture uses a first quantization parameter (QP), wherein a second value is applied for the predetermined threshold when the video picture uses a second QP, and wherein the first QP is higher than the second QP and the first value is lower than the second value.

C9. The decoder of any one of embodiments C1 to C6, wherein a first value is applied for the predetermined threshold when the first side comprises a first coding unit (CU), the second block comprises a second CU, and the vertical or horizontal boundary comprises a CU boundary, wherein a second value is applied for the predetermined threshold when the first side comprises a first sub-block, the second block comprises a second sub-block, and the vertical or horizontal boundary comprises a sub-block boundary, and wherein the first value is lower than the second value.

C10. The decoder of any one of embodiments C1 to C6, wherein a first value is applied for the predetermined threshold when unidirection prediction is used for the video picture, wherein a second value is applied for the predetermined threshold when bi-direction prediction is used for the video picture, and wherein the first value is lower than the second value.

C11. The decoder of any one of embodiments C1 to C6, wherein a first value is applied for the predetermined threshold when the first and second sides use unidirection prediction, wherein a second value is applied for the predetermined threshold when the first and second sides use bi-direction prediction, and wherein the first value is lower than the second value.

C12. The decoder of any one of embodiments C1 to C11, wherein the predetermined threshold is reduced when a specific coding tool is used for coding the video picture.

C13. The decoder of C11, wherein reshaping is the specific coding tool.

While various embodiments are described herein (including the Appendix, if any), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for deblocking at least one vertical or horizontal boundary between a first block of samples of a coding unit and a second block of samples of the coding unit, wherein a video picture comprises the coding unit, and wherein the first and second blocks of samples use a same reference picture, the method comprising:
   obtaining a first motion vector component in the first block of samples;
   obtaining a second motion vector component in the second block of samples;
   setting a boundary strength equal to 1;
   determining whether an absolute difference between the first motion vector component and the second motion vector component is equal to or larger than a predetermined threshold, wherein the predetermined threshold is N/16, where N is an integer greater than 0 and less than 16; and
   as a result of determining that the absolute difference between the first motion vector component and the second motion vector component is equal to or larger than the predetermined threshold, applying deblocking to the vertical or horizontal boundary between the first block of samples and the second block of samples.

2. The method of claim 1, wherein
the first motion vector component comprises a first horizontal motion vector component and the second motion vector component comprises a second horizontal motion vector component.

3. The method of claim 1, wherein
the first motion vector component comprises a first vertical motion vector component and the second motion vector component comprises a second vertical motion vector component.

4. The method of claim 1, wherein the predetermined threshold is reduced when a specific coding tool is used for coding the video picture.

5. The method of claim 1, wherein the method further comprises including the predetermined threshold in a bitstream.

6. The method of claim 5, wherein
the predetermined threshold is included in a slice header.

7. The method of claim 1, wherein
a first value is applied for the predetermined threshold when the video picture is a first temporal layer,
a second value is applied for the predetermined threshold when the video picture is a second temporal layer, and
the first temporal layer is higher than the second temporal layer and the first value is lower than the second value.

8. The method of claim 1, wherein
a first value is applied for the predetermined threshold when the video picture uses a first quantization parameter (QP),
a second value is applied for the predetermined threshold when the video picture uses a second QP, and
the first QP is higher than the second QP and the first value is lower than the second value.

9. The method of claim 1, wherein
a first value is applied for the predetermined threshold when the first side comprises a first coding unit (CU), the second block comprises a second CU, and the boundary comprises a CU boundary,
a second value is applied for the predetermined threshold when the first side comprises a first sub-block, the second block comprises a second sub-block, and the boundary comprises a sub-block boundary, and
the first value is lower than the second value.

10. The method of claim 1, wherein
a first value is applied for the predetermined threshold when unidirection prediction is used for the video picture,
a second value is applied for the predetermined threshold when bi-direction prediction is used for the video picture, and
the first value is lower than the second value.

11. The method of claim 1, wherein
a first value is applied for the predetermined threshold when the first and second sides use unidirection prediction,
a second value is applied for the predetermined threshold when the first and second sides use bi-direction prediction, and
the first value is lower than the second value.

12. The method of claim 1, further comprising deriving the predetermined threshold from a bitstream.

13. The method of claim 12, wherein
the predetermined threshold is derived from a slice header.

14. A non-transitory computer readable medium storing a computer program comprising instructions which, when executed by processing circuitry, causes the processing circuitry to carry out the method of claim 1.

15. An apparatus for deblocking at least one vertical or horizontal boundary between a first block of samples of a coding unit and a second block of samples of the coding unit, wherein a video picture comprises the coding unit, and wherein the first and second blocks of samples use a same reference picture, the apparatus comprising:
processing circuitry configured to cause the apparatus to perform a method comprising:
obtaining a first motion vector component in the first block of samples;
obtaining a second motion vector component in the second block of samples;
setting a boundary strength equal to 1;
determining whether an absolute difference between the first motion vector component and the second motion vector component is equal to or larger than a predetermined threshold, wherein the predetermined threshold is N/16, where N is an integer greater than 0 and less than 16; and
as a result of determining that the absolute difference between the first motion vector component and the second motion vector component is equal to or larger than the predetermined threshold, applying deblocking to the vertical or horizontal boundary between the first block of samples and the second block of samples.

16. The apparatus of claim 15, wherein
the first motion vector component comprises a first horizontal motion vector component and the second motion vector component comprises a second horizontal motion vector component, or
the first motion vector component comprises a first vertical motion vector component and the second motion vector component comprises a second vertical motion vector component.

17. The apparatus of claim 15, wherein
a first value is applied for the predetermined threshold when the video picture is a first temporal layer,
a second value is applied for the predetermined threshold when the video picture is a second temporal layer, and
the first temporal layer is higher than the second temporal layer and the first value is lower than the second value.

18. The apparatus of claim 15, wherein
a first value is applied for the predetermined threshold when the video picture uses a first quantization parameter (QP),
a second value is applied for the predetermined threshold when the video picture uses a second QP, and
the first QP is higher than the second QP and the first value is lower than the second value.

19. The apparatus of claim 15, wherein
a first value is applied for the predetermined threshold when the first side comprises a first coding unit (CU), the second block comprises a second CU, and the boundary comprises a CU boundary,
a second value is applied for the predetermined threshold when the first side comprises a first sub-block, the second block comprises a second sub-block, and the boundary comprises a sub-block boundary, and
the first value is lower than the second value.

20. The apparatus of claim 15, wherein
a first value is applied for the predetermined threshold when unidirection prediction is used for the video picture,
a second value is applied for the predetermined threshold when bi-direction prediction is used for the video picture, and
the first value is lower than the second value.

* * * * *